United States Patent
Segawa

[15] 3,637,995
[45] Jan. 25, 1972

[54] AGGREGATE MOTION MECHANISM

[72] Inventor: Kaoru Segawa, Tokyo-to, Japan

[73] Assignee: Nippon Electric Company, Limited, Minato-ku, Tokyo, Japan

[22] Filed: Oct. 19, 1970

[21] Appl. No.: 81,800

[30] Foreign Application Priority Data

Oct. 25, 1969 Japan....................................44/85359

[52] U.S. Cl...............................................235/92 C, 235/136
[51] Int. Cl............................................................G06m 1/22
[58] Field of Search.....................235/92 EA, 92 C, 133, 136

[56] References Cited

UNITED STATES PATENTS 3,015,439 1/1962 Gang..................................235/136 X

*Primary Examiner*—Daryl W. Cook
*Assistant Examiner*—Joseph M. Thesz, Jr.
*Attorney*—Ostrolenk, Faber, Gerb & Soffen

[57] ABSTRACT

An aggregate motion mechanism capable of receiving information, preferably in binary form, presented in either serial or parallel fashion for accumulating or adding the information and converting the information into a visually observable output. In a multibit binary form of the aggregate motion device, each bit position is comprised of a pair of gear members mounted in freewheeling fashion upon a common shaft. A third radially aligned satellite gear is secured to a collar mounted in a freewheeling fashion upon the common shaft, and is adapted to mesh with the pair of cooperating gears. The next adjacent bit position has one of its bevel gears secured to the collar to which the aforementioned satellite gear is secured so as to couple the binary input information from each stage to the next succeeding stage in accordance with its binary "weight." The final output stage may be provided with a print drum or other indicia-bearing drum for the purpose of either printing out or visually displaying a character or other symbol representative of the binary information impressed upon the aggregate motion mechanism, enabling its use as either a converter or selector device for converting binary information into alpha-numeric form or for selecting a particular symbol for display or printout or may, alternatively, be employed as an adder or accumulator device in which binary data may be accumulated.

12 Claims, 8 Drawing Figures

Figures 1, 2:
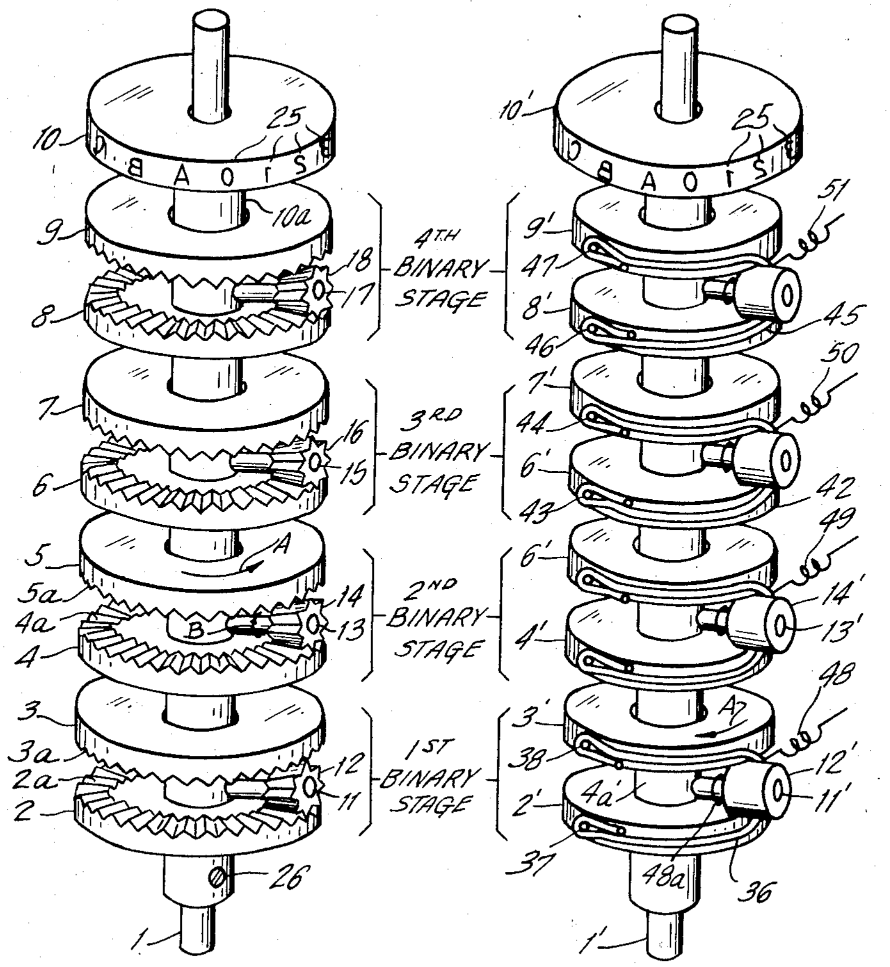

INVENTOR.
KAORU SEGAWA

BY

Ostrolenk, Faber, Gerb & Soffer

ATTORNEYS

PATENTED JAN 25 1972 3,637,995

SHEET 2 OF 2

INVENTOR.
KAORU SEGAWA

BY

Ostrolenk, Faber, Gerb & Soffen
ATTORNEYS

AGGREGATE MOTION MECHANISM

The present invention relates to adder-selector devices, and more particularly to an aggregate motion mechanism for converting binary information into alpha-numeric information, or for selecting a particular character or symbol for display or printout under the control of a binary input or, alternatively, for use as an adder or accumulator having a display or printout capability.

There exists a number of applications in which it is either desirable or necessary to provide radix conversion means. For example, all present-day computer systems normally utilize a radix of base two or some integral exponent thereof such as, for example, base eight (octal) or base 16 (sexadecimal). The above-mentioned radices are extremely advantageous for use in computer systems due to the nature of the electronic devices employed therein. However, printout of data processed by computers is more easily readable and understood by an operator when presented in alphabetic and/or numeric form. As a result, most computer systems are provided with peripheral devices for converting data, which has been handled and processed by the computer in either binary, octal or sexadecimal form, into numeric and/or alphabetic form.

The present invention is characterized by providing a novel aggregate motion device which is capable of operating at relatively high speeds and which is further characterized by a simplicity of design which provides a highly reliable and accurate device of minimum size and components.

The aggregate motion device of the present invention is comprised of a common shaft for mounting gear assemblies thereon in a freewheeling fashion wherein the number in each such gear assembly represents one binary bit position within a multibit binary word. Each gear assembly, in turn, is comprised of a pair of bevel gears mounted upon the aforementioned common shaft in a freewheeling fashion. A radially aligned satellite gear is positioned between the aforementioned pair of bevel gears and is secured to a collar which is further mounted to the aforementioned common shaft in a freewheeling fashion. The next adjacent gear assembly has one of its bevel gears secured to the aforementioned collar for transferring the binary state of each gear assembly to a printout or display ring which may be provided with indicia arranged around its periphery, whereby each of the individual indicia is representative of a unique binary word. Binary information may be inputted by subjecting one gear of the bevel gear pairs to either no rotation (representative of binary ZERO), or rotation through one full revolution (representative of binary ONE state). The gear ratio between each adjacent gear assembly is 2:1, whereby a binary ONE state (full revolution) from a least significant bit position is converted into a half revolution by the gear assembly of the next most significant binary state. In a like manner, a half revolution is converted into a quarter revolution by the next most significant gear assembly, and so forth. In the case where four gear assemblies are provided upon the common shaft, the output indicia-bearing ring may be incrementally stepped through 16 different angular positions representative of any of the binary input words from OOOO to 1111.

The aggregate motion device may further be employed as an adder or accumulator in which a plurality of binary input words may be sequentially or simultaneously applied as inputs to the aggregate motion device in either a positive or a negative manner to provide an accumulation or sum of the inputted binary words. The binary input information is initially converted by means capable of rotating at least one of the bevel gears through either a full revolution (representative of a binary ONE state) or no revolution (representative of a binary ZERO state), which means may either take the form of a driven gear meshing with a gear provided around the periphery of one of the bevel gears, or may take the form of a driven pulley whose output is coupled to the bevel gears by means of a pulley belt entrained about the pulley wheel and one of the bevel gears.

As an alternative embodiment to the gear assemblies described hereinabove, the pair of bevel gears may be replaced by a pair of discs and a radially aligned satellite roller interposed therebetween. A cord having a first end secured to one point on the periphery of one disc is entrained about the radially aligned satellite roller and has its opposite end secured to a corresponding point on the remaining one of the pair of discs. Tensioning means may be provided for maintaining constant tension upon each satellite roller or, alternatively, a second roller and cord may be provided for each assembly to assure the fact that the roller and associated collar will experience the precise amount of rotation.

The aggregate motion device of the present invention is extremely advantageous for use in printing-type selecting mechanism such as are provided in typewriters or teletypewriters, or other like devices, which receive binary coded information for controlling the selection of printing type, or may, alternatively, be employed as an output display device or combined accumulator and display device.

It is, therefore, one object of the present invention to provide an aggregate motion mechanism capable of reliable high-speed operation and which is simple in design resulting in a minimum number of components, thus yielding a device for use as a character or symbol selector for printout or display as well as an adder or accumulator having a display or printout capability.

Another object of the present invention is to provide an aggregate motion device for use as a printing-type selecting mechanism which may be employed in typewriters, teletypewriters, and other like devices, which receive binary coded information in the form of multibit binary words for selecting printing types in accordance with the inputted binary information.

Still another object of the present invention is to provide a novel aggregate motion mechanism which is extremely advantageous for use in a keyboard-operated counting device whereby a binary aggregate output of the information is generated and the output thus obtained is capable of either being printed out or otherwise visually displayed.

There as well as other objects of the present invention will become apparent when reading the accompanying description and drawings in which:

FIG. 1 is a perspective view showing a preferred embodiment of an aggregate motion mechanism designed in accordance with the principles of the present invention.

Figure 1A:
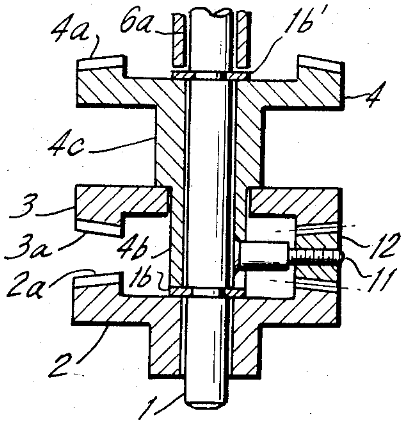

FIG. 1*a* shows a detailed sectional view of a portion of the aggregate motion device of FIG. 1.

FIG. 2 is a perspective view showing an alternative embodiment of the aggregate motion mechanism of the present invention.

Figure 3:
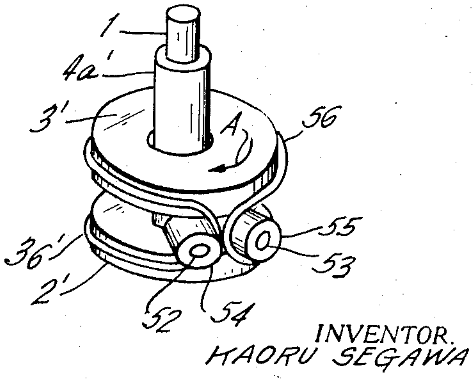
Figure 3A:
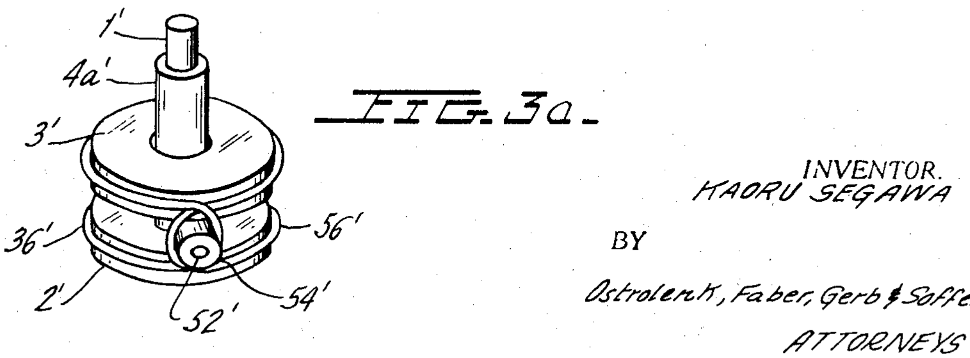

FIGS. 3 and 3*a* are perspective views showing additional preferred embodiments of the present invention in which only a portion of an aggregate motion assembly is displayed.

Figure 4A:
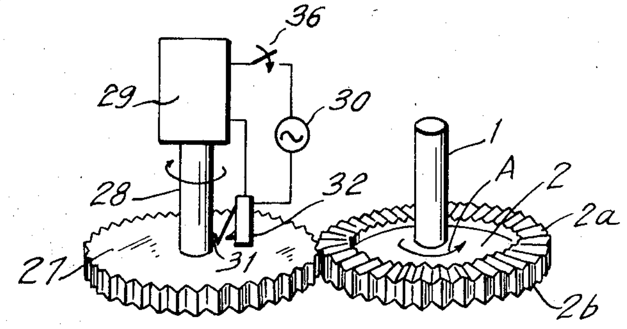
Figure 4B:
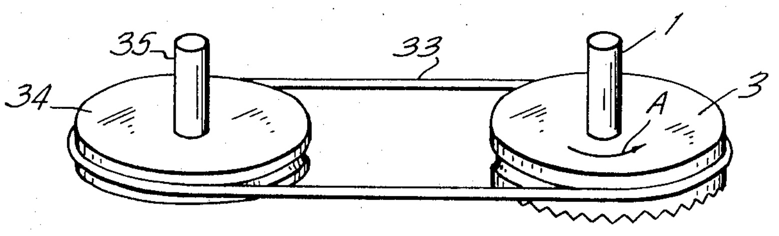

FIGS. 4*a* and 4*b* are perspective views showing alternative embodiments of input drive means which may be employed with the aggregate motion devices of FIGS. 1–3.

Figure 5:
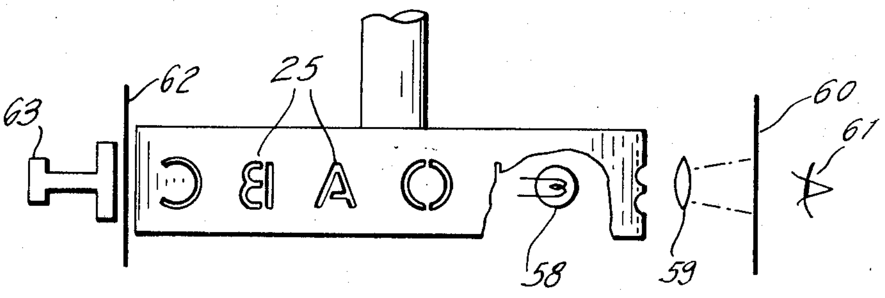

FIG. 5 is a detailed elevational view partially sectionalized of the display or output ring of FIGS. 1 and 2.

One preferred embodiment of the aggregate motion device is shown in FIG. 1 and is comprised of a common shaft 1 which serves to support all the members of the mechanism in a freewheeling fashion, as will become evident from the ensuing description. The aggregate motion device of FIG. 1 is capable of accepting binary information in the form of a four-bit binary data word, and is accordingly provided with four gear assemblies. A first such gear assembly is comprised of bevel gears 2 and 3, each having gear teeth 2*a* and 3*a* along the marginal circumferential portions thereof with the bevel gears arranged to confront one another in the manner shown. A radially aligned satellite bevel gear 12 is arranged to mesh with bevel gears 2 and 3 and is mounted in a freewheeling manner upon branch shaft 11. Branch shaft 11 is fixedly secured to the lower end 4*b* of a downwardly extending boss 4*c* integrally joined to bevel gear 4 having gear teeth 4*a* along its marginal circumferential portion. Bevel gear 4, boss 4*c* and branch shaft 11 are all rigidly joined to one another so as to be rotated in unison about shaft 1 for a purpose to be more fully described.

As shown best in the detailed sectional view of FIG. 1*a*, bevel gear 3 rotates in a freewheeling manner about the lower portion 4*b* of boss 4*c*. Bevel gear 2 is arranged to rotate in a freewheeling manner about shaft 1, while bevel gear 4, boss 4*c* and branch shaft 11 are arranged to rotate in a freewheeling manner about shaft 1.

Shaft 1 is provided with a ring-shaped groove 1*b* which is arranged to receive a retainer ring 1*a*. The bottom edge of boss 4*c* rests upon retainer ring 1*a* and is prevented from experiencing any downward linear motion. A second such ring-shaped groove 1*b'* is provided a spaced distance from groove 1*b*, and is arranged to receive a similar retainer ring 1*a'* whose bottom edge is positioned immediately above the top surface of bevel gear 4 and whose top edge supports the boss 6*a* of the next adjacent bevel gear 6. Similar retainer rings are provided at spaced intervals along shaft 1 so as to prevent each of the bevel gears 4, 6 and 8 from experiencing any linear motion in the axial direction of shaft 1. If desired, a similar retainer ring may be provided adjacent the lower edge of the boss 2*b* of bevel gear 2.

Bevel gears 6 and 8 are constructed in a similar fashion to bevel gear 4, bevel gears 14, 16 and 18 are constructed in a similar fashion to bevel gear 12, branch shafts 13, 15 and 17 are similar to branch shaft 11, and bevel gears 5, 7 and 9 are similar in fashion to bevel gear 3. Branch shaft 17 is secured to boss 10*a* of a retainer ring 10 which may be provided with indicia 25 in the form of alphabetic or numeric-type heads or openings for printout or display in a manner to be more fully described.

Considering one stage of the aggregate motion mechanism comprised of bevel gears 2 and 3, satellite bevel gear 12 and its associated boss 4*c*, the operation of the aggregate motion mechanism will now be described in connection with FIGS. 1 and 1*a*.

The second stage of the aggregate motion mechanism is comprised of bevel gears 4 and 5 and satellite bevel gear 14. Assuming bevel gear 4 to be fixed in its position while bevel gear 5 is rotated through one full revolution in the direction shown by arrow A, the satellite bevel gear 14 which meshes with gear teeth 5*a* and 4*a*, respectively, is caused to rotate about branch shaft 13 in the direction shown by arrow B. Simultaneously therewith, satellite bevel gear 14 and branch shaft 13 rotate in the direction shown by arrow A through one-half revolution in the same direction in which bevel gear 5 is rotated. Thus, when gear 5 is rotated in the direction shown by arrow A, branch shaft 13 is rotated in the same direction through one-half the rotated angle of bevel gear 5. A similar result will be obtained when bevel gear 5 remains fixed in position and bevel gear 4 is rotated one full revolution, thereby causing branch shaft 13 to be rotated in the same direction as bevel gear 4, but through one-half the angle of rotation of bevel gear 4. Assuming that both bevel gears 4 and 5 are rotated simultaneously, then branch shaft 13 will be rotated through an angle corresponding to one-half the arithmetic sum of the angles of rotation of bevel gears 4 and 5 regardless of the combinations of these angles, i.e., regardless of whether the directions of rotation are the same or opposite.

Since branch shaft 13 is fixedly secured to the downwardly extended boss 6*a* of bevel gear 6 located in the third binary stage of the aggregate motion mechanism, bevel gear 6 will be rotated through the same angle as branch shaft 13.

Although the operation of the aggregate motion mechanism of FIG. 1 has been described in connection with the bevel gears which form the second stage of the mechanism (i.e., bevel gears 4, 5 and 13), it should be apparent from the foregoing description that a similar operation will be obtained for all other combinations of bevel gears, as shown in FIG. 1. Thus, when the output rotational angle of a lower stage is transmitted through the associated branch shaft to the lower bevel gear of an adjacent stage of the mechanism and an input rotating angle is applied to the upper bevel gear of that stage, the branch shaft for that stage is rotated through an angle corresponding to one-half of the arithmetic sum of the rotating angle transmitted from the preceding lower stage and the input rotating angle so that the lower bevel gear of the upper stage is rotated by the same angle as the branch shaft for that stage.

The invention will now be described in more detailed fashion in conjunction with the entire assembly of FIG. 1 which is provided with four stages of bevel gear combinations wherein the aggregation and selection of binary information having four digits or less can be carried out by each of the stages which correspond to a binary bit position.

The lowermost bevel gear 2, shown in FIG. 1, is maintained fixed so that the gear cannot be rotated. This can be carried out by providing a setscrew 26 for fixedly securing bevel gear 2 to shaft 1 which may likewise be fixedly secured so as to experience no rotation whatsoever.

Bevel gears 3, 5, 7 and 9 are provided with suitable driving means in order that input rotating angles may be introduced from an input source to these gears. FIGS. 4*a* and 4*b* show two suitable arrangements in which binary information may be inputted to the various stages of the aggregate motion mechanism.

As shown in FIG. 4*a*, bevel gear 2 may be provided with gear teeth 2*b* along its outer peripheral edge and which is arranged to mesh with a gear 27 driven by a shaft 28 under control of a motor 29 energized by a source 30 when switch 36 is closed. To assure the fact that bevel gear 3 will be precisely driven through one full revolution, shaft 28 may be provided with a detent or projection 31 which opens a normally closed microswitch 32 to disconnect power source 30 from motor 29 as soon as the shaft 28, and hence bevel gear 2, experiences a rotation of precisely one revolution. Alternatively, the projection or detent 31 may be provided on bevel gear 2, with the microswitch 32 arranged to cooperate with the detent provided thereon to similarly deenergize and also preferably brake motor 29 to an abrupt stop.

FIG. 4*b* shows another alternative manner of driving bevel gear 3 wherein the periphery of gear 3 may be provided with an annular-shaped groove 3*b* for receiving a pulley belt 33 entrained about the periphery of bevel gear 3 and a pulley wheel 34 rotated by a shaft 35 which, in turn, may be coupled to a motor of the type shown by motor 29 in FIG. 4*a*. A similar detent and microswitch arrangement may also be provided with the embodiment of FIG. 4*b* for controlling the bevel gear 3 to experience precisely one full revolution. It should be understood that the driving means of FIGS. 4*a* and 4*b* are merely exemplary, and any other suitable driving means may be employed. For example, the circular gear 27 may be replaced by a wormgear, if desired. Obviously, any other type of input drive means may be provided.

The input drive means inserts the binary information from the highest digit to the lower digit successively into bevel gears 9, 7, 5 and 3 so that when the binary input of each digit is binary ONE, the bevel gear corresponding to the input is rotated through one complete revolution and so that no rotation at all is experienced by those bevel gears receiving a binary ZERO input. For simplification of the explanation, it will be assumed that each bevel gear assumes one complete revolution when receiving a binary ONE state and that the rotating directions thereof are all in the same direction.

Let it be assumed that the binary information to be inputted into the aggregate motion device is 0001 (where the binary ONE is in the least significant position). In this case, oniy bevel gear 3 will be rotated by one full revolution, while gears 5, 7 and 9 are not rotated by their associated input drive means. In this case, bevel gear 3 experiences one full revolution, and the bevel gears of the more significant binary bit positions are rotated through angles one-half that of their adjacent lower binary bit positions. Thus, bevel gear 4 is rotated through one-half turn, bevel gear 6 is rotated through one-quarter turn, bevel gear 8 is rotated through one-eighth turn, and the printing types display ring 10 is rotated by one-sixteenth turn.

If the binary input word is 0010, then only bevel gear 5 is rotated through one complete turn. The rotation of gear 5 is coupled through the succeeding gear assemblies which reduce the angle of rotation in three steps in the manner described above, causing the printing-type wheel 10 to rotate through a one-eighth turn. Similarly, in the case where the binary input information is 0100 or 1000, then the printing-type wheel 10 is rotated through a one-quarter turn or one-half turn, respectively. If the information in binary form is 0110, the printing-type wheel 10 is rotated through the sum of one-quarter plus one-eighth plus one-sixteenth, or an aggregate of seven-sixteenths turn. From the above description, it will be apparent that the printing-type wheel 10 can be rotated through an integral multiple of a one-sixteenth turn, wherein the total number of incremental one-sixteenth turns is determined by the binary input. For example, a binary input of 1000 causes the print wheel 10 to rotate through an angle equal to 8 times one-sixteenth or a one-half turn; a binary input of 0100 will cause the printing-type wheel 10 to rotate through an angle of 4 times one-sixteenth or a quarter turn, and so forth.

Furthermore, when a plurality of binary numbers are aggregated together with the limitation that the binary input words do not exceed four digits in length, an output corresponding to the sum of the plurality of the binary numbers can be obtained at printing-type wheel 10. For example, when binary numbers such as 0010 and 0110 are added together, their sum is 1000. If these binary numbers are inputted into the aggregate motion mechanism of the present invention, printing-type wheel 10 is rotated through a one-eighth turn under control of the first binary input word (0010) and is further rotated through a three-eighth turn by the introduction of the latter binary number (0110), whereby the printing-type wheel is ultimately rotated through a one-eighth plus three-eighths or one-half turn corresponding to the binary sum 1000. From this description, it can be seen that the aggregate motion device can operate as an adder or accumulator, whereby the sums of successive binary words may be accumulated therein. It should further be noted that the aggregate motion device is capable of forming differences as well as sums of the binary words inputted thereto.

FIG. 2 is a perspective view showing another preferred embodiment of the present invention which is comprised of a common shaft 1′ for supporting components of the aggregate motion device in a freewheeling manner. Each of the gear assemblies of FIGS. 1 and **1*a* are replaced by disc and roller assemblies such as, for example, the circular discs 2′ and 3′ which are of equal diameters, and are positioned respectively below and above a roller 12′ mounted in a freewheeling manner upon branch shaft 11′ so that the cylindrical surface of roller 12′ rollingly engages the confronting surfaces of circular discs 2′ and 3′. Branch shaft 11′ is fixedly secured to the downwardly extending collar 4*c*′ which is integrally joined to circular disc 4′, whereby the longitudinal axis of branch shaft 11′ is arranged at a right-angle to the axis of common shaft 1′. Circular disc 3′ is mounted in a freewheeling manner upon the collar 4*c*′ of disc 4′ in a fashion substantially identical to that of bevel gear 3 and the boss of bevel gear 4. A cord or string 36 has a first end thereof secured to the periphery of disc 2′ by pin 37. The cord follows the peripheral surface of disc 2′ until the point at which it is entrained about roller 12′ at which time it follows the peripheral surface of disc 3′, whereby its opposite end is secured to the peripheral surface of disc 3′ by pin 38**.

Similar cords or strings 39, 42 and 45 are respectively provided for each of the remaining stages of the aggregate motion mechanism. A tension spring 48 has a first end **48*a* looped about branch shaft 11′ to urge the branch shaft in a direction opposite to the tensile force exerted by the cord 36** so that the cord is constantly maintained under tension.

Circular discs 4′, 5′ and 6′ are arranged in a similar fashion to circular discs 2′, 3′ and 4′, respectively, and the same arrangements are repeated for circular discs 6′, 7′ and 8′ and for circular discs 4′, 9′ and 10′, respectively. In the embodiment of FIG. 2, circular disc 10′ constitutes a printing-type wheel for displaying the output of the aggregate motion mechanism wherein the peripheral surface of the wheel is provided with 16 printing-type fonts 25 disposed at equal intervals about the peripheral surface.

FIG. 3 shows one manner in which the arrangement of FIG. 2 may be modified. Only one representative stage of the aggregate motion mechanism is shown in FIG. 3, which stage is comprised of circular disc 3′ mounted to rotate in a freewheeling manner about the boss **4*c*′ of circular disc 4′ (not shown in FIG. 3 for purposes of simplicity). Boss 4*c*′ is arranged to rotate in a freewheeling manner about common shaft 1′ as is circular disc 2′. Boss 4*c*′ has rigidly secured thereto and extending therefrom a pair of branch shafts 52 and 53 each having a roller 54 and 55, respectively, mounted thereto in a freewheeling manner. A first cord 36′ substantially identical to the cord 36 shown in FIG. 2 has its extreme end points secured to the peripheral surfaces of discs 2′ and 3′, and is entrained about roller 54 in a manner substantially identical to the manner in which cord 36 is entrained about roller 12′. A second cord 56 has its free ends secured to the peripheral surfaces of discs 2′ and 3′, and is entrained about second roller 55 so as to be substantially the mirror image of the arrangement of cord 36′ and roller 54. The use of second satellite roller 55 and cord 56 eliminates the need for the tension spring 48, since the forces applied by the cords 36′ and 56 to their branch shafts 52 and 53 are respectively opposite in direction and equal in magnitude. Thus, for example, if the disc 3′ is rotated in the direction shown by arrow A while the position of disc 2′ is kept fixed, cord 36′ will cause roller 54, and hence branch shaft 52, to be urged in the same direction. Since the end of cord 56 which is secured to the peripheral surface of disc 3′ moves in the same rotational direction, roller 55 and branch shaft 53 are free to follow the movement of roller 54 and branch shaft 52. However, cord 56, roller 55 and branch shaft 53 limit the rotation imparted to branch shaft 52 to the precise rotational angle imparted to disc 3′, due to the equal and opposite forces imparted to rollers 54 and 55 by the cords 36′ and 56**, respectively.

Although, in the embodiment shown in FIG. 3, two rollers and associated cords have been employed for the purpose of simplifying the explanation of the invention, it should be apparent that the two rollers may be replaced by a single roller 54 and the two cords may be substituted by one continuous cord 36″ looped around the single roller in the manner shown in FIG. 3*a*.

The detailed operation of the embodiments of FIGS. 2 through 3*a* is as follows:

Referring initially to FIG. 2, let it be assumed that disc 2′ is held fixed, while disc 3′ is rotated through one full revolution in the direction shown by arrow A (it will be assumed that the direction or rotation of all disc are the same). This causes the branch shaft 11′ which rollingly supports roller 12′ to be drawn by cord 36 against the tension of spring 16′ so that it is rotated through one-half turn in the same direction of rotation as disc 3′ about shaft 1′. The operation will be the same as described above if circular disc 3′ is held fixed and disc 2′ is rotated through one full revolution in the direction shown by arrow A. If discs 2′ and 3′ are both rotated simultaneously, then branch shaft 11′ will be rotated through an angle equal to one-half the sum of the rotating angles of the two circular discs. In the above description, it is assumed that the length of cord 36, the positions of the pins 37 and 38 fixing the ends of the cord 36 and the spring 48 looped about branch shaft 11′ are all selected so that the discs may be rotated freely through one complete turn. Since branch shaft 11′ is mounted to the boss of disc 4′ of the second state, circular disc 4′ will thus be rotated through the same angle rotation as that experienced by branch shaft 11′, i.e., one-half revolution.

Although the above-described operation pertains to the lowest stage of the aggregate motion mechanism of FIG. 2, it should be apparent that the operation of all other stages will be performed in a similar manner. That is, the output rotation angle from the next preceding lower stage is transmitted to the lower circular disc of its adjacent upper stage, and when input information is applied to the upper circular disc, a rotational angle corresponding to one-half the sum of the rotating angles of the lower and upper circular discs is conveyed to the lower circular disc in the adjacent upper stage of the mechanism. It should be obvious that driving mechanisms which have been described in connection with FIGS. 4*a* and 4*b* may be employed as the driving mechanisms for the aggregate motion device of FIG. 2.

A detailed description of the operation of the modified embodiments of FIGS. 3 and 3*a* will be omitted herein for purposes of simplicity, it being understood that the operation of the mechanism is substantially the same as that of the embodiment of FIG. 2, with the exception that the two cords 36' and 56 which are entrained about their associated rollers 54 and 55 (as shown in FIG. 3) or about a single roller 54' (see FIG. 3*a*) eliminate any play which may exist between a single cord in a branch shaft, thereby eliminating the need for tensile springs 48 through 51.

Since the aggregate motion mechanism of the embodiment shown in FIG. 2 is comprised of four stages of similar circular disc assemblies, it is possible to form an aggregation of binary numbers having four digits or less substantially in the same manner as was described hereinabove in connection with the embodiment of FIG. 1. In operation, the lowermost circular disc 2' is held fixed to a suitable structure member (not shown) or, alternatively, to shaft 1' so that the disc 2' will not undergo any rotation. Circular discs 3', 5', 7' and 9' are respectively attached to suitable driving means (for example, of the type shown in FIGS. 4*a* and 4*b*) so that the most significant binary bit is transmitted to circular disc 9' and the next succeeding most significant bits are transmitted to circular discs 7', 5' and 3', respectively. When the state of each binary bit of the four-bit binary word is binary ONE, their corresponding circular discs 3', 5', 7' and 9' are rotated through one complete turn, whereas when the binary state of each bit position is binary ZERO, the corresponding circular discs experience no rotation.

Thus, if the binary input word in 0001 (where the binary ONE is in the least significant position), circular disc 3' is the only disc rotated through one complete turn, while circular discs 5', 7' and 9' experience no rotation. This results in circular disc 4' experiencing one-half turn rotation, circular disc 6' experiencing one-quarter turn rotation, circular disc 8' experiencing one-eighth turn rotation and circular-type wheel 10' experiencing one-sixteenth turn rotation. Likewise, if the binary input information is 0010, only circular disc 5' is rotated through one complete turn. The rotational angle of circular disc 5' is reduced in three stages as described hereinabove, causing circular-type wheel 10' to ultimately undergo a rotation of one-eighth turn. Similarly, if the input information applied is 0100 or 1000, then circular-type wheel 10' is rotated by one-quarter or one-half turn, respectively. Thus, if an inputted binary word such as 0111 is applied to the aggregate motion mechanism, circular-type wheel 10' will be rotated by the sum of one-quarter plus one-eighth plus one-sixteenth turns for a total aggregate of seven-sixteenths turn. In this manner, any binary number of four-bit length can produce a corresponding output rotating angle for driving circular-type wheel 10' through an integral multiple of a sixteenth of a turn multiplied by the magnitude of the binary number, whereby a selection of printing types provided on the surface of wheel 10' can thereby be effectuated.

It can be seen from the foregoing description that the present invention provides an aggregate motion mechanism comprised of a plurality of circular disc combinations or gearwheel combinations of extremely simple and yet rugged design which enables an aggregation of binary numbers giving a total number of digit positions corresponding to the aforementioned combinations to be accumulated therein. The simplicity of design further enables the entire aggregate motion mechanism to be provided along a single common shaft and to be capable of accepting input information parallel by word and can accept two parallel words simultaneously. Also, a plurality of inputs can be added in a superposed manner and the time required for the aggregation is constantly determined, regardless of the contents of the information to be selected, under the control of the rotational driving rate from the input driving devices. It should further be noted that it is possible that the rotational outputs of each of the above-described embodiments may be converted into linear motion in a direction perpendicular to the longitudinal axis of the common shaft through the use of a suitable gear mechanism, or may be converted into linear motion in a direction parallel to the longitudinal axis of the common shaft through the use of a suitable screw mechanism. For example, the periphery of print ring 10 may be provided with gear teeth to mesh with an elongated rack, aligned either perpendicular or parallel to the axis of shaft 1 and having indicia along one surface thereof.

The output-type wheel may assume a variety of forms. For example, as shown in FIG. 5, the type wheel may be a hollow cylindrical shell having openings provided around its periphery in the form of alphabetic and/or numeric characters 25. A stationary mounted light source 58 may project light radially outward which light rays pass through the character or symbol-shaped opening selected, is focused by optical means 59, and is portrayed in a sharp manner upon a screen 60 which may, for example, be a backlighted screen observable at position 61. Alternatively, the indicia may be raised-type fonts which may be imprinted upon a paper document 62 upon the actuation of a relay controlled type hammer 63. Obviously, any other form of printout or visually observable display may be utilized, depending only upon the needs of the user.

Although this invention has been described with respect to its preferred embodiments it should be understood that many variations and modifications will now be obvious to those skilled in the art, and it is preferred, therefore, that the scope of the invention be limited not by the specific disclosure herein, but only by the appended claims.

What is claimed is:

1. An aggregate motion means for driving an indicia-bearing member to a selected one of a plurality of discrete positions under control of multidigit input information, said means comprising:

a common shaft;

a plurality of rotatable mechanisms equal in number to the number digits in said input information being mounted upon said shaft, each mechanism being associated with one of said digit positions and being comprised of:

first and second rotatable elements mounted upon said shaft in a freewheeling manner;

means for rotating one of said elements through an angle commensurate with the magnitude of its associated input digit;

satellite means mounted upon said shaft in freewheeling manner and being positioned between said first and second rotatable members so as to be driven through an angle of rotation equal to 1/N times the angle of rotation experienced by its associated first rotatable member where N = the radix of the number system representing said input information and where:

N is a real integer greater than 1;

coupling means for connecting the satellite means of each rotatable mechanism to the second rotatable element of the next adjacent rotatable mechanism and for connecting the rotatable mechanism associated with the most significant digit of input information to said indicia-bearing member for driving said indicia-bearing member to any selected one of the Nth possible discrete positions, where N = to the number of rotatable mechanisms and is a real integer.

2. The device of claim 1 wherein said indicia-bearing member is a rotatable member mounted upon said shaft in a freewheeling manner;

said member having indicia in the form of raised-type fonts representing characters or other symbols arranged at spaced angular intervals in the region of the periphery of said rotatable member.

3. The device of claim 1 wherein said indicia-bearing member is a rotatable member mounted upon said shaft in a freewheeling manner;

said member having indicia in the form of uniquely shaped openings representing characters or other symbols arranged at spaced angular intervals in the region of the periphery of said rotatable member;

a stationary light source arranged to pass light through an opening aligned therewith for projection of the aligned opening upon a suitable display surface.

4. The device of claim 1 wherein each of said first and second rotatable elements is a bevel gear having gear teeth arranged along one surface thereof so that the gear teeth of said first and second bevel gears confront one another;

each of said satellite means being comprised of a collar mounted upon said shaft;

a projection extending outwardly from said collar;

and a freewheeling bevel gear mounted upon the free end of said projection having gear teeth around its periphery meshing with the gear teeth of its associated first and second elements.

5. The device of claim 4 wherein each of said coupling means includes means for integrally joining the collar of each mechanism to the second rotatable element of the next adjacent rotatable element.

6. The device of claim 5 further comprising means for holding the second rotatable element of the rotatable mechanism associated with the least significant digit of said input information in a fixed position.

7. The device of claim 4 wherein the first rotatable element of each rotatable mechanism is mounted to rotate in a freewheeling manner about the collar of its associated satellite means.

8. The device of claim 1 wherein each of said first and second rotatable elements is a ring-shaped member having flat confronting surface portions confronting one another;

each of said satellite means being comprised of a collar mounted upon said shaft;

a projection extending radially outward from said collar;

a freewheeling roller being mounted upon the free end of said projection and having its periphery engaging the confronting flat surfaces of said ring-shaped members;

a cord having a first and second end respectively secured to predetermined locations on the peripheries of said ring-shaped members and being looped about said roller.

9. The device of claim 8 further comprising tensioning means coupled to each of said satellite means for maintaining said cords under constant tension.

10. The device of claim 9 wherein said tensioning means is comprised of a second cord having first and second ends secured respectively to predetermined locations along the peripheries of said ring-shaped members and being looped about its associated roller so as to apply a driving force to its associated roller which maintains its associated first cord under constant tension.

11. The device of claim 9 wherein said tensioning means is comprised of a second cord having first and second ends secured respectively to predetermined locations along the peripheries of said ring-shaped members;

each of said collars having a second projection and a second freewheeling roller mounted on the free end thereof;

said second cord being looped about its associated second roller which maintains its associated first cord under constant tension.

12. An aggregate motion means for driving an indicia-bearing member to a selected one of a plurality of discrete positions under control of multidigit binary input information said means comprising:

a common shaft;

a plurality of rotatable mechanism equal in number to the number digits in said input information being mounted upon said shaft, each mechanism being associated with one of said digit positions and being comprised of:

first and second rotatable elements mounted upon said shaft in a freewheeling manner;

means for rotating one of said elements through an angle commensurate with the magnitude of its associated binary input digit whereby said one of said rotatable input elements is rotated through either a full revolution or held fixed dependent upon the binary state of its associated bit position of the input information;

satellite means mounted upon said shaft in a freewheeling manner and being positioned between said first and second rotatable members so as to be driven through an angle of rotation equal to one-half the sum of the angles of rotation experienced by its associated first and second rotatable elements;

coupling means for connecting the satellite means of each rotatable mechanism to the second rotatable element of the next adjacent rotatable mechanism and for connecting the rotatable mechanism associated with the most significant digit of input information to said indicia-bearing member for driving said indicia-bearing member to any selected one of $2^x$ possible discrete positions, where $x=$ to the number of rotatable mechanism and where $x$ is a real integer.

* * * * *